US008023965B2

(12) United States Patent  
Michaud

(10) Patent No.: US 8,023,965 B2  
(45) Date of Patent: Sep. 20, 2011

(54) METHOD, SYSTEM AND APPARATUS FOR LOCATING A MOBILE COMMUNICATIONS DEVICE

(75) Inventor: Alain Michaud, Kanata (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 659 days.

(21) Appl. No.: 12/151,775

(22) Filed: May 9, 2008

(65) Prior Publication Data

US 2009/0280827 A1    Nov. 12, 2009

(51) Int. Cl.
*H04W 24/00*    (2009.01)
(52) U.S. Cl. ............... 455/456.1; 455/456.2; 455/456.3; 455/457
(58) Field of Classification Search ............... 455/456.1, 455/456.2, 456.3, 457
See application file for complete search history.

(56) References Cited

U.S. PATENT DOCUMENTS

| | | | |
|---|---|---|---|
| 7,149,531 B2 | 12/2006 | Misikangas | |
| 7,228,136 B2 | 6/2007 | Myllymaki et al. | |
| 7,418,063 B2 * | 8/2008 | Chen et al. | 375/340 |
| 2002/0115446 A1 * | 8/2002 | Boss et al. | 455/456 |
| 2005/0143098 A1 * | 6/2005 | Maillard | 455/456.5 |
| 2005/0181804 A1 | 8/2005 | Misikangas et al. | |
| 2005/0208952 A1 | 9/2005 | Dietrich et al. | |
| 2006/0087425 A1 | 4/2006 | Haeberlen et al. | |
| 2006/0176849 A1 * | 8/2006 | Gass | 370/328 |
| 2006/0240845 A1 | 10/2006 | Feuerstein et al. | |

FOREIGN PATENT DOCUMENTS

FR    2871893 A    12/2005

OTHER PUBLICATIONS

Singh et al., Locus: Wireless LAN Location Sensing, Major Qualifying Project Report, Jan. 19, 2004.
Krumm et al., The NearMe Wireless Proximity Server, The Sixth Intn'l Conference on Ubiquitous Computing, Sep. 7-10, 2004, pp. 283-300, Nottingham, England.

* cited by examiner

*Primary Examiner* — Marisol Figueroa

(57) ABSTRACT

A system, method and apparatus for locating a mobile communication device are provided. A data set is received, the data set comprising strengths of signals received at the mobile communication device from a plurality of wireless access points. The data set further comprises identifiers of wireless access points from which each signal was received. Scaled signal strengths are determined from the strengths of signals. The scaled signal strengths are compared with a record of signal strengths of wireless access points at given locations. Based on the comparing, a location of the mobile communication device is determined.

17 Claims, 5 Drawing Sheets

METHOD, SYSTEM AND APPARATUS FOR LOCATING A MOBILE COMMUNICATIONS DEVICE

FIELD

The specification relates generally to presence systems, and specifically to a method, system and apparatus for locating a mobile communications device.

BACKGROUND

Presence data generally isn't real-time and its accuracy is lacking. For example, instant messaging applications, such as MSN messenger, simply sets a user's status to away if no keyboard/mouse interaction is detected in a certain timeframe. Although this information is useful under some circumstances, it fails to address the simple case where the user is reading a paper document at his/her desk. Another example would be presence systems which rely on calendar entries: even though a user is scheduled for a meeting in a specific room, there is no guarantee that he/she is actually there. This meeting may have been missed, double-booked etc.

Determination of presence on a more granular scale has been addressed in the past through schemes for determining the actual real-time location of a person. However many of such schemes are not cost effective and require specific hardware, for example RFID tags carried by individuals, with readers positioned at building entrances and/or throughout a building, costly GPS systems and the like. Further, WiFi (802.11x) systems may include tracking/triangulation schemes using specialized access points and triangulation software and/or specialized WiFi (802.11x) fingerprinting using hardware integrated into the access points, for example a Cisco Wireless Location Appliance from Cisco Systems 170 West Tasman Drive San Jose, Calif. 95134. However the use of such specialized access points adds cost and involves significant infrastructure changes to existing systems.

U.S. Pat. No. 7,149,531 to Pauli Misikangas discloses a system which addresses this problem by using the signal strengths of base stations in a wireless local-area network (WLAN) as measured by a given wireless device, to develop a probabilistic model of indicating a probability distribution for signal values of several base stations at several locations, and further using the probabilistic model and signal values at a radio interface to determine the location of the given wireless device at a later time. However, calibration of the system is specific to a particular wireless device, and if the location of another type of wireless device is to be determined, the system must be recalibrated using the other type of wireless device.

A similar approach is disclosed in "Locus: Wireless LAN Location Sensing" by Arvinder Singh and Ali Taheri, in Project Report submitted to the Worcester Polytechnic Institute and dated Jan. 19, 2004 ("Locus"). The system of locus involves recording the signal strengths of several visible wireless access points for a given number of known coordinates, for example in a building. To then later find a location of a wireless device communicating with the access points, the observed signal strengths of the access points are compared against the stored values and the closest match results in a location approximation. However, Locus is prone to false signature matches, or no match at all, as matching is performed on a per value basis (i.e. absolute received signal strength) and further uses static thresholds of signal strength for matching. Further, signal strengths from different orientations are averaged into one value for a location resulting in loss of detail, as signal strength can vary greatly with respect to orientation.

SUMMARY

A first aspect of the specification provides a method of locating a mobile communication device. The method comprises receiving a data set comprising strengths of signals received at the mobile communication device from a plurality of wireless access points, the data set further comprising identifiers of wireless access points from which each signal was received. The method further comprises determining scaled signal strengths from the strengths of signals. The method further comprises comparing the scaled signal strengths with a record of signal strengths of wireless access points at given locations. The method further comprises determining a location of the mobile communication device based on the comparing.

The method may further comprise determining a scaling factor, and wherein the determining scaled signal strengths comprises scaling the signal strengths by the scaling factor. Determining the scaling factor may comprise designating a reference signal in the data set, determining a signal strength of the reference signal, and calculating the scaling factor based on the signal strength of the reference signal, such that the reference signal is normalized upon scaling. Determining the scaling factor may be based on an antenna strength of a survey device used to collect the record of signal strengths compared to an antenna strength of the mobile communications device. The method may further comprise receiving the antenna strength of the mobile communications device in conjunction with the data set. The method may further comprise receiving an identifier of the mobile communications device, and determining the antenna strength of the mobile communications device based on the identifier. Determining the antenna strength of the mobile communications device based on the identifier may comprise retrieving the antenna strength from a database, the antenna strength of the mobile communications device stored in association with the identifier in the database.

The method may further comprise receiving the scaling factor in conjunction with the data set.

The method may further comprise receiving an identifier of the mobile communications device, and determining the scaling factor based on the identifier. Determining the scaling factor based on the identifier may comprise retrieving the scaling factor from a database, the scaling factor stored in association with the identifier in the database.

Determining the location of the mobile communication device based on the comparing may comprise determining that the mobile communication device is at one of the given locations if the scaled signal strengths match the record of signal strengths of wireless access points at one of the given locations. The scaled signal strengths may match the record of signal strengths of wireless access points at one of the given locations if a pattern of the scaled signal strengths matches a pattern in the record of signal strengths. Determining that the mobile communication device is at one of the given locations if the scaled signal strengths match the record of signal strengths of wireless access points at one of the given locations may occur via a neural network.

The data set and the record of signal strengths may be arranged by the identifiers of the wireless access points The method may further comprise receiving at least one survey data set comprising: strengths of survey signals, the survey signals comprising signals received at a mobile survey device from the plurality of wireless access points during a signal survey; identifiers of wireless access points which originated each the survey signal; and at least one location of the mobile survey device when the survey signals were received. The method may further comprise processing the at least one survey data set to produce the record of signal strengths of wireless access points at given locations. The strength of each signal may comprise an average of strengths of each signal. The method may further comprise storing the record of signal strengths.

Each access point may comprise an 802.11 access point and each signal may comprise an 802.11 signal. The identifiers may comprise at least one of a media access control (MAC) address and a name of the wireless access point.

The method may further comprise providing the location to at least one of a presence engine and a PBX for providing at least one of a location based service and a location based feature.

A second aspect of the specification provides a computing device for locating a mobile communication device. The computing device comprises a communications interface enabled for receiving a data set comprising strengths of signals received at the mobile communication device from a plurality of wireless access points, the data set further comprising identifiers of wireless access points from which each the signal was received. The computing device further comprises a processing unit in communication with the communications interface. The processing unit is enabled for: determining scaled signal strengths from the strengths of signals; comparing the scaled signal strengths with a record of signal strengths of wireless access points at a given locations; and determining a location of the mobile communication device based on the comparing.

The computing device may further comprise a memory for storing the record of signal strengths.

The processing unit may be further enabled to operate a neural network for comparing the scaled signal strengths with the record of signal strengths and for determining the location of the mobile communication device based on the comparing.

The processing unit may be further enabled for processing at least one survey data set received from a mobile survey device, the at least one survey data set comprising: strengths of survey signals, the survey signals comprising signals received at the mobile survey device from the plurality of wireless access points during a signal survey; identifiers of wireless access points which originated each survey signal; and at least one location of the mobile survey device when the survey signals were received; and wherein the processing unit is further enabled for processing the at least one survey data set to produce the record of signal strengths of wireless access points at given locations.

The communications interface may be further enabled for providing the location to at least one of a presence engine and a PBX for providing at least one of a location based service and a location based feature.

BRIEF DESCRIPTIONS OF THE DRAWINGS

Embodiments are described with reference to the following figures, in which.

DETAILED DESCRIPTION OF THE EMBODIMENTS

Figure 1:
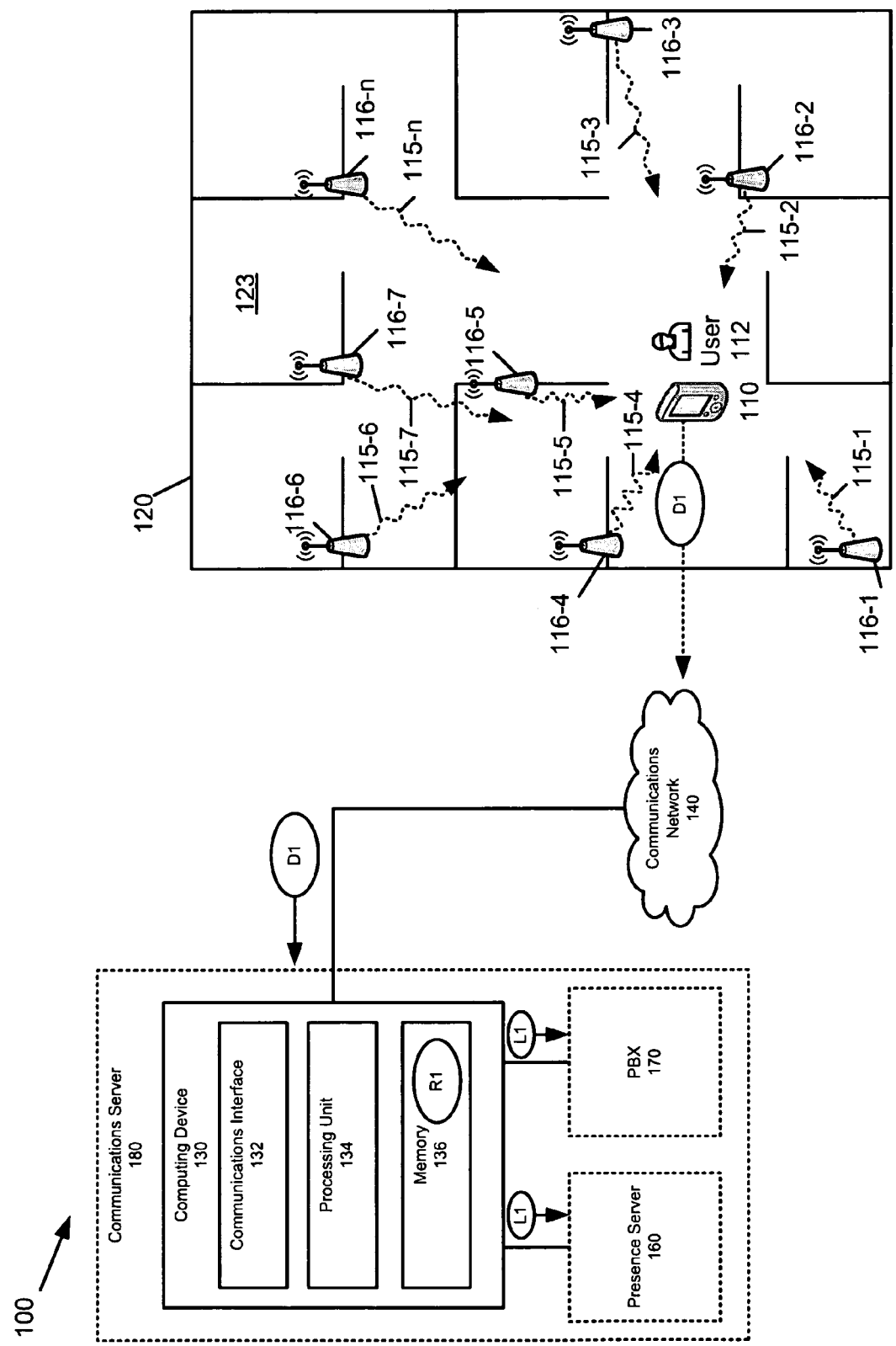
FIG. 1 depicts a system for determining the location of a mobile communications device, according to a non-limiting embodiment.

FIG. 1 depicts a system 100 for locating a mobile communications device 110 according to a non-limiting embodiment, the mobile communications device 110 associated with a user 112. The mobile communications device 110 is generally enabled to receive signals 115-1, 115-2 . . . 115-$n$ (collectively signals 115, and generically a signal 115), from wireless access points (WAP) 116-1, 116-2 . . . 116-$n$ (collectively WAPs 116, and generically a WAP 116). The mobile computing device 110 is in communication with the computing device 130 via the communications network 140, the computing device 130 enabled for locating the mobile communications device 110.

The communications network 140 is generally enabled to facilitate communications between the mobile communications device 110 and the computing device 130 and comprises any desired combination of wireless and wired networks, including but not limited to the Internet, a LAN, a WAN, a WLAN, a cell network (e.g. 3G and the like), WiFi, WiMAX, and the like. However, as the mobile communications device 110 is generally communicating in a wireless manner, the communications network 140 generally includes components for communicating wirelessly with the mobile communications device 110. However, the computing device 130 may be enabled to communicate via the communications network 140 in a wired or wireless manner as desired.

Figure 2:
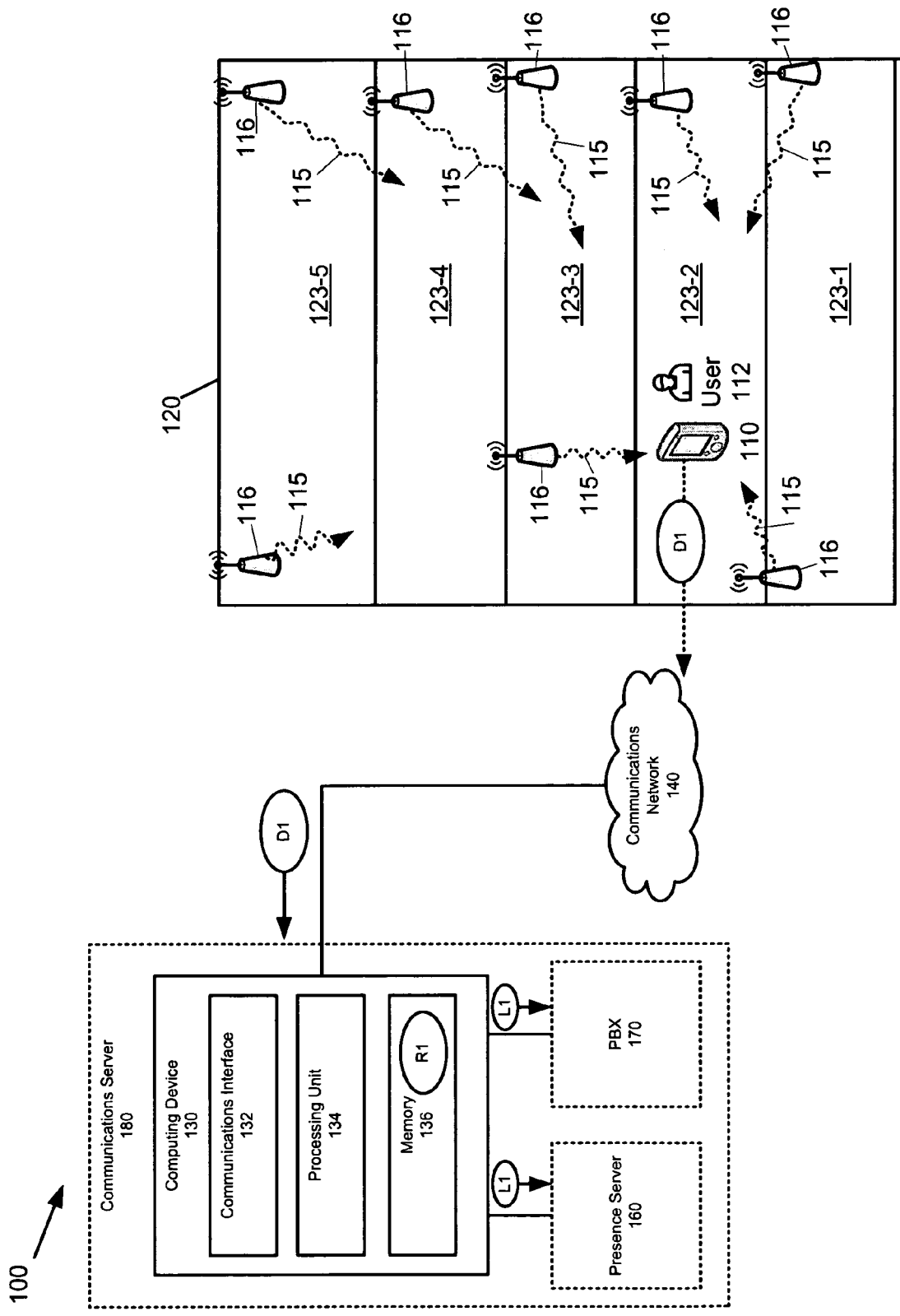
FIG. 2 depicts a system for determining the location of a mobile communications device, according to a non-limiting embodiment.

The WAPs 116 are generally deployed in a building 120. While FIG. 1 depicts a single floor 123 of the building 120, it is understood that the building 120 may comprise multiple floors 123, with WAPs deployed on each floor, and the user 112, and hence the mobile communications device 110, is free to roam around each floor 123, and from floor to floor. For example, see FIG. 2, which depicts a system 100' for locating the mobile communications device 110, according to a non-limiting embodiment, FIG. 2 being substantially similar to FIG. 1, with like elements having like numbers, however the system 100' comprises a building 120' having five floors 123-1, 123-2 . . . 123-5.

It is further understood that while the system 100 comprises the building 120 in which the WAPs 116 are deployed, the WAPs 116 may also be deployed outdoors and/or that the mobile communications device 110 is generally enabled to receive signals 115 from WAPs 116 which are both indoors and outdoors, while being carried by the user 112 both indoors and outdoors.

In some embodiments, the WAPs 116 may be part of a wireless communications network, such as a wireless local area network (WLAN). In some embodiments, the WLAN may be part of the communications network 140, while in other embodiments, such a WLAN may be separate from the communications network 140. In some embodiments, the mobile communications device 110 may be enabled to receive and transmit data over the wireless communications network by establishing a communication session with a WAP 116, and receiving the signals 115 from the WAPs 116, and transmitting signals to the WAPs 116. In a specific non-limiting embodiment, each WAP 116 is enabled to communicate via an 802.11x protocol, also known as a WiFi protocol, as known to a person of skill in the art. However, each WAP 116 may be enabled to communicate via other protocols as will occur to persons of skill in the art.

In general the WAPs 116 are enabled to generate and transmit the signals 115. The signals 115 generally comprise data whose content may vary depending on the mode of the WAP 116. For example, prior to establishing a communication with the mobile communication device 110, the signal 115 may comprise one or more identifiers of the WAP 116 which originated the signal 115 and an indication that the WAP 116 is available to establish a communication session. Such identifiers may include, but are not limited to, a network address of the WAP 116, a media access control (MAC) address of the WAP 116, a name of the WAP (e.g. "Mitel $2^{nd}$ Floor Access Point"), and the like. If a communication session is established with the mobile communication device 110, then the signals 115 may further comprise data to be conveyed to the user 112 via the mobile communications device 110 (e.g. if/when the user 112 is using the mobile communications device 110 to send/receive e-mail, access the internet etc.).

Figure 3:
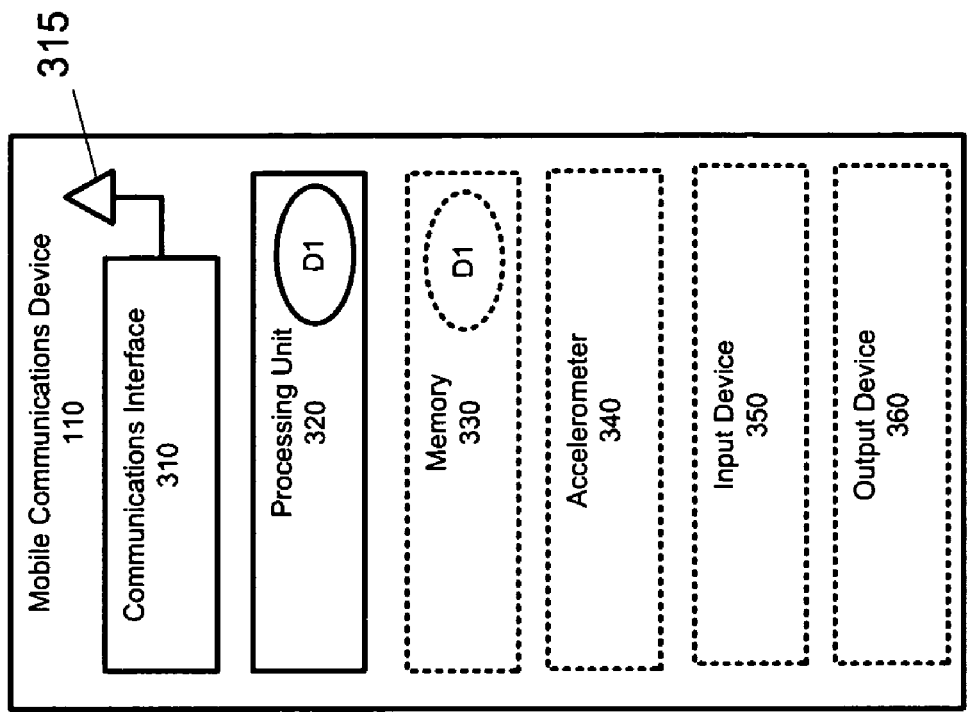
FIG. 3 depicts a mobile communications device, according to a non-limiting embodiment.

Attention is now directed to FIG. 3 which depicts a non-limiting embodiment of the mobile communications device 110. The mobile communications device 110 is generally enabled to receive the signals 115, generate a data set D1 comprising strengths of the signals 115 received at the mobile communication device 110 from the plurality of WAPs 116, and transmit the data set D1 the computing device 130, described below. In some embodiments, the mobile communications device 110 comprises a pager, PDA, a cell phone, a laptop computer, a combination, and the like. However, in some embodiments, the mobile communication device 110 may be a locator device whose main function is to assist the computing device 130 in locating the mobile computing device 110. For example, in these embodiments, each employee of a company in the building 10 may provided with such a locator device.

The mobile communications device 100 generally comprises a communications interface 312, a processing unit 320 and, in some embodiments, a memory 330, all in communication, for example via a computer bus, as known to one of skill in the art. The communications interface 312 is enabled to receive the signals 115 via the appropriate protocol, in accordance with the protocol used for communication by the WAPs 116, as described above. For example, in embodiments where the WAPS 16 are enabled to communicate via a WiFi protocol, the communications interface 312 is generally enabled to communicate via a compatible WiFi protocol. The communications interface 312 generally comprises an antenna 315 to assist receiving of the signals 115.

The communications interface 312 is further enabled to wirelessly transmit the data set D1, compiled by the processing unit 320, as described below, to the computing device 130 via the communications network 140, as described below. Hence, the communications interface 312 is enabled to communicate via protocols appropriate to the communications network 140. In some embodiments, such protocols may be similar to the protocols used by the WAPs 116, but in other embodiments, different protocols may be used. In a particular non-limiting embodiment, for example where the WAPs 116 act as wireless access points to the communication network 140, the communications interface 312 may transmit the data set D1 to the computing device 130 via one of the WAPs 116. In another non-limiting embodiment, the communications interface 312 may transmit the data set D1 to the computing device 130 via a wireless element the communications network different from the WAPs 116.

The processing unit 320 is enabled to compile the data set D1, the data set D1 comprising strengths of signals 115 received at the mobile communication device 110 from the plurality of WAPs 116, the data set D1 further comprising identifiers of the WAPs 115 from which each signal 115 was received. As described above, such identifiers may include, but are not limited to, a network address of the WAP 116, a media access control (MAC) address of the WAP 116, a name of the WAP (e.g. "Mitel $2^{nd}$ Floor Access Point"), and the like. In general, the identifiers may be extracted from the signals 115 by processing the data transmitted via the signals 115. The strengths of signals 115 received at the mobile communication device 110 from the plurality of WAPs 116 may also be determined by processing the signals 115. As known to a person of skill in the art, mobile communication devices in general may be enabled to determine the signal strength of wireless access points, as a user of a mobile communication device may prefer to establish a communication session with a wireless access point that has the strongest signal. Hence, algorithms for determining signal strength from a wireless access point are known to one of skill in the art, and any such algorithm may be used to determine the signal strength. In general signal strengths may vary due to attenuation as the signals 115 pass through walls, furniture etc., and/or strength of a transmitter in each WAP 116, etc.

Once the signals 115 have been received and the signal strength determined, the processing unit 115 is enabled to compile the data set D1. Alternatively, the data set D1 may be compiled as the strength of each signal 115 is determined. In any event, a non-limiting embodiment of the data set D1 is provided in Table I:

TABLE I

| WAP Identifier | Signal Strength |
| --- | --- |
| 116-1 | 115 |
| 116-2 | 160 |
| 116-3 | 97.5 |
| 116-4 | 240 |
| 116-5 | 250 |
| 116-6 | 72.5 |
| 116-7 | 65 |
| 116-n | 52.5 |

Table I is arranged in column form, with a first column containing rows each of which identifies a WAP 116 from which a signal was received, and a second column containing rows which contain the signal strength, in generic units for each signal 115 which originated from the corresponding WAP 116 identified in the first column. However, the format of the data set D1 is not particularly limiting as long as each signal strength is associated with an identifier of the WAP 116 from which the signal 115 originated. For example the data set D1 may also be arranged in rows or simply transmitted as a series of paired identifiers and signal strengths. Furthermore, the format and/or units of the signal strengths are not particularly limiting, and may be measured in dB, RSSI (received signal strength indication), RCPI (received channel power indicator), or any other suitable format and/or units.

Hence, as signal strengths from different WAPs 116 vary at a given location due to attenuation as the signals 115 pass through walls, furniture etc., and/or strength of a transmitter in each WAP 116, etc., the data set D1 represents a unique WAP 116 signature of the signals 115 at the location of the mobile communications device 110.

In some embodiments, the data set D1 may further comprise an identifier of the mobile communications device 110.

For example, in some embodiments, the system 100 may comprise a plurality of mobile communication devices 110, each of which may transmit a data set D1 to the communications network 140. In these embodiments, each data set D1 may be uniquely identified by the identifier of the mobile communications device 110, such that each mobile communications device 110 may be uniquely identified.

In any event, once the data set D1 is compiled the processing unit 320 is enabled to pass the data set D1 to the communications interface 312 for wireless transmission to the computing device 130.

In some embodiments, the mobile communications device 110 further comprises the memory 330. In these embodiments, the memory may store a copy of the data set D1. The data set D1 may then be re-processed at a later time by the processing unit 320 and compared to signal strengths from the WAPs 116 at this later time. If the signal strengths have changed (e.g. by a threshold value), the processing unit 320 may determine the at the mobile communications device 110 has moved, and recompile the data set D1 based on determinations of the signal strength at the later time.

In some embodiments, the mobile computing device 110 further comprises an accelerometer 340 in communication with the processing unit 320, for example via the computing bus. Accelerometers are known to persons of skill in the art, and generate a signal when they are moved. Hence, in these embodiments, the processing unit 320 may determine that the mobile communications device 110 has moved upon receiving a signal from the accelerometer 340.

In further embodiments, the mobile communications device 110 may also comprise an input device 350 for receiving input from the user 112, such as a keyboard, a pointing device, a scrollwheel (and the like) or a combination, and/or an output device 360 for outputting data to the user 112, such as display device, a speaker, and/or a combination.

Returning to FIG. 1, the computing device 130 generally comprises a communications interface 110, a processing unit 134 and, in some embodiments, a memory 136, all in communication via, for example, a computer bus, as known to one of skill in the art. In some embodiments, the computing device 130 comprises a location server, generally dedicated to locating the mobile communications device 110.

In some embodiments, the computing device 130 is in communication with a presence server 160 and/or a PBX 170. In other embodiments, the computing device 130, the presence server 160 and/or the PBX 170 may be elements of a communications server 180.

The communications interface 132 is enabled to receive the data set D1 via the communications network 140 using any wired or wireless protocol compatible with the communication network 140, as desired.

The processing unit 134 is enabled for: determining scaled signal strengths from said strengths of signals recorded in the data set D1; comparing the scaled signal strengths with a record R1 of signal strengths of WAPs 116 at given locations; and determining a location L1 of the mobile communication device 1100 based on the comparing.

In some embodiments, the scaled signal strengths are determined via a neural network enabled to determine patterns in the data set, and compare these patterns to the record R1. In these, embodiments, as described below, the neural network is first trained based on the record R1, for example during a survey process. Further details are described below.

In some embodiments, the scaled signal strengths are determined by determining a scaling factor, and wherein determining the scaled signal strengths comprises scaling the signal strengths by the scaling factor.

In some embodiments, the scaling factor may be determined based on a designated reference signal in the data set D1. For example, the processing unit 134 receives the data set D1 from the communication interface 132, and designates a reference signal strength in the data set D1, for example the signal 115 with the greatest strength. The processing unit 134 then determines a signal strength of the reference signal, and calculates the scaling factor based on the signal strength of the reference signal, such that the reference signal is normalized upon scaling.

To illustrate this, using the signal strengths in Table 1, the signal 115 having the greatest strength is the signal which originated from WAP 116-5. The scaling factor is then the inverse of the value of the greatest strength, in this case 250, and the scaled signal strengths may be determined by dividing each of the signal strengths in Table 1, by the signal strength 250, resulting in Table II.

TABLE II

| WAP Identifier | Relative Signal Strength |
| --- | --- |
| 116-1 | 0.46 |
| 116-2 | 0.64 |
| 116-3 | 0.39 |
| 116-4 | 0.96 |
| 116-5 | 1.00 |
| 116-6 | 0.29 |
| 116-7 | 0.26 |
| 116-n | 0.21 |

Hence, variations in the signal strength due to the size, shape etc. of the antenna 315 and/or any reception effects introduced by the mobile communication device 110 itself are removed from the data set D1 by determining the scaled signal strength. For example, if a second mobile communications device similar to the mobile communications device 110, but with a larger, more powerful antenna were located in the same location as the mobile communication device 110, the signal strengths in data set D1 generated by the second mobile communications device would be generally larger than the signal strengths in the data set D1 generated by the mobile communications device 110, but all generally by the same relative amount. Hence, determining the relative signal strengths removes variations in the signal strength that are dependent on the mobile communications device 110.

However, the scaling factor may also be determined based on the strength an antenna 315A of a mobile survey device 510 (described below with reference to FIG. 5) compared to the strength the antenna 315 of the mobile communications device 110. The mobile survey device 510 is generally used to collect data stored in the record R1, during a surveying process described below. For example, if the strength of the antenna 315A of the mobile survey device 510 is greater or weaker than the strength of the antenna 315 of the mobile communications device 110, then signals 115 received at each of the devices 110 and 510 will register as stronger or weaker. In other words, the strength of the signal 115 is dependent on the nature of an antenna which is receiving it.

Hence the scaling factor may be determined based on the relative strengths of the antennae 315 and 315A. For example, if the antenna 315A is 4× strength of the antenna 315, the scaling factor is determined to be 4. Conversely, if the antenna 315 is 4× strength of the antenna 315, the scaling factor is determined to be ¼. By scaling the strengths of the signals 115 (e.g. multiply them by the scaling factor), the effect of the antenna 315 is removed from the strengths of the signals 115, and the scaled signal strengths are representative of signal strengths that would have been collected by the mobile survey device 510 at the given location.

In some embodiments, the scaling factor may be stored at the mobile communications device 110 and transmitted to the communications server 180 in conjunction with the data set D1. In other embodiments, the scaling factor may be stored at in the memory 136 (and/or an external database), and the processing unit 134 is enabled to retrieve the scaling factor as required. In some of these embodiments (e.g. comprising multiple types of mobile communication devices 110 with antennas of different signal strengths), the mobile communications device 110 transmits an identifier in conjunction with the data set D1 and the scaling factor is retrieved based on the identifier: the scaling factor specific to the mobile communication device 110 is stored in association with the identifier of the mobile communication device 110.

In some embodiments, the scaling factor is calculated on an as needed basis. For example, the strengths of the antenna 315 and the antenna 315A are stored at the mobile communication device 110, the memory 136 (and/or a database) and/or a combination, the strengths of the antenna 315 and the antenna 315A being retrieved by the processing unit 134 and/or transmitted to the communications server 180 as desired. In some of these embodiments, the strength of the antenna 315 may be retrieved based on the identifier of the mobile communications device 110.

The processing unit 134 is further enabled to compare the scaled signal strengths with the record R1 of signal strengths of WAPs 116 at the given location, the record R1 having been generated previously in a surveying process using the mobile survey device 510, described below. The record R1 generally comprises strengths of signals of the WAPs 116 at given locations, identifiers of the WAPs 116 which originated each signal 115 received during the survey, and an identifier of the location where the signals 115 were received during the survey. In some embodiments, each entry in the record R1 further comprises a timestamp (i.e. time/date on which the entry was collected/created). In other words, each entry in the record R1 generally represents the unique WAP 116 signature of the signals 115 at a given location, and associated with the identifier of the given location. Hence, by determining the scaled signal strengths in the data set D1 received from the mobile communication device 110, and comparing the scaled signal strengths with the record R1 to find the closest match, the location L1 of the mobile communications device 110 is determined to be the given location of the closest match.

Identifiers of the location L1 of the mobile communications device L1 may include, but are not limited to, a longitude and latitude, a height above sea level, an identifier of a location/room/place in the building 120 (e.g. floor number, room number, In some embodiments, the record R1 is stored at the memory 136, while in other embodiments, the record R1 is stored in a database (not depicted) in communication with the computing device 130, the record R1 being retrieved as necessary. The computing device 130 may place queries to the database for a look-up based on the scaled signal strengths.

In a particular non-limiting embodiment, the processing unit 134 comprises a neural network, for example a three layer neural network, as known to one of skill in the art, the inputs to the neural network being the data set D1 and the output being location of the mobile communications device 110. The neural network may be trained based on the record R1 and/or during the survey process.

Once the location L1 of the mobile communications device 110 is determined, the location L1 may be transmitted to the presence server 160 and/or the PBX 170 (and/or the presence server 160 may further transmit the location L1 to the PBX 170 or vice versa). The presence server 160 and/or the PBX 170 may then process the location L1 to provide a location based service and/or route calls/messages etc. based on the location L1 of the mobile communication device 110. For example, with the location L1, the presence server 160 and/or the PBX 170 may be enabled to provide at least one of the following features:

A mobile extension feature can decide whether it should ring the user's 112 desk phone or only his/her mobile phone (e.g. the mobile communications device 110), when a call is received.

A presence application, such as New Point Messenger from Mitel Networks Corporation, 350 Legget Drive Kanata, Ontario, Canada, could provide the approximate location of the user 112.

A calendar client could ring a user's phone if he/she is late and/or far away from a current meeting location. In some embodiments, a further level of discrimination may be added: for example, the calendar client may not ring the user's phone if he/she is on route or near the meeting room.

A presence application may provide context to a location.

Location specific information may be displayed at the mobile computing device 110 and/or a cell phone etc.; for example, upon determining that the mobile computing device 110, and hence the user 112, is in a cafeteria the cafeteria menu may be transmitted and displayed at the mobile computing device 110 and/or cell phone etc.

Determine the closest available free phone and enable the mobile computing device 110 to call the closest available free phone while displaying a message indicating the recipient and caller, for example if the user has an 802.11x device such as a laptop or PDA, etc. but no phone. Further, the call may be re-routed to the laptop or PDA if it's equipped with a soft-phone. Alternatively, if the user 112 is near a phone (working in a lab sitting by an idle phone), the call may be routed to that idle phone with an optional message on the phone's screen displaying data associated with call (who the call is from, who it is intended for etc.).

Provide assistance in various dispatching scenarios:
  in a hospital, assist in dispatching the closest available nurse to a patient when that patient's buzzer it pressed;
  where security is crucial, dispatch the closest guard to an area and/or intelligently point surveillance cameras to that location/guard for better coverage; and
  in the hospitality industry, such as in a hotel, assist with dispatching room service, repairmen etc. (e.g. locate the nearest relevant hotel employee).

Figure 4:
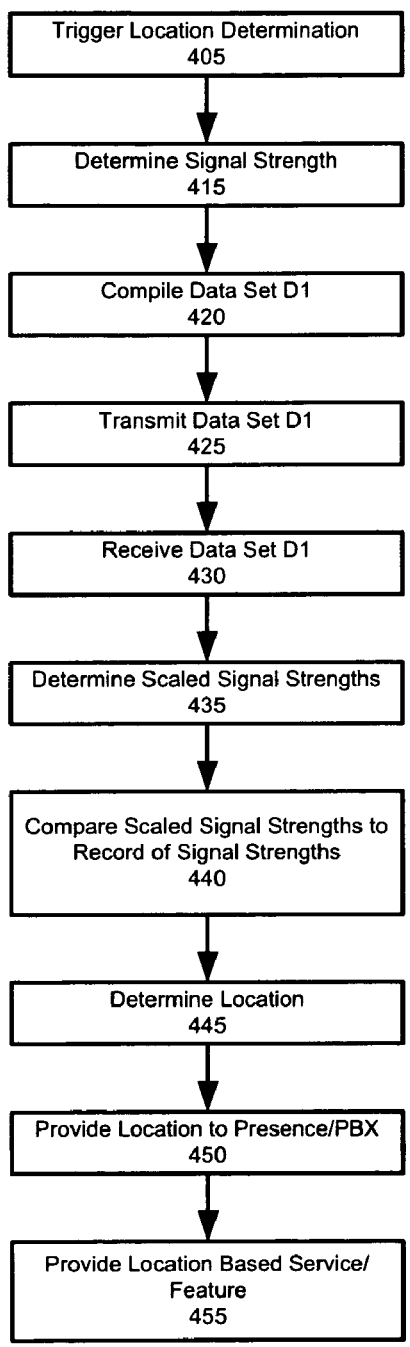
FIG. 4 depicts a method for determining the location of a mobile communications device, according to a non-limiting embodiment.

Attention is now directed to FIG. 4 which depicts a method 400 for locating a mobile communications device, such as the mobile communications device 400. In order to assist in the explanation of the method 400, it will be assumed that the method 400 is performed using the system 100. Furthermore, the following discussion of the method 400 will lead to a further understanding of the system 100 and its various components. However, it is to be understood that the system 100 and/or the method 400 can be varied, and need not work exactly as discussed herein in conjunction with each other, and that such variations are within the scope of present embodiments.

At step 405, location determination is triggered. In one non-limiting embodiment, the location determination may be triggered via the computing device 130 transmitting a request for the data set D1 to the mobile communications device 110.

Such a request may in turn be triggered by a request for the location of the mobile communications device 110 received at the computing device 130 from the presence server 160 and/or the PBX 170. For example, the PBX 170 may receive a call for the user 112 and may request the location of the user 112 and/or the mobile communications device 110, in order to assist in a determination of how to handle the call. Similarly, the presence server 160 may wish to determine if the user 112 is really "away" from a personal computer or if the user 112 is still in the vicinity of the personal computer, but not interacting with the personal computer.

In other non-limiting embodiments, the computing device 130 may transmit the request for the data set D1 on a periodic basis. Similarly, the location determination may be triggered by the mobile communications device 110 on a periodic basis.

In yet another non-limiting embodiment, the location determination may be triggered when the mobile communications device 110 determines that it may have changed location. For example, the processing unit 320 may receive a signal from the accelerometer 340, if present. Or the mobile communications device 110 may be enabled to determine signal strengths from the WAPs 116 on a periodic basis, and compare the resulting data set D1 with a previously compiled data set D1 stored in the memory 330. In these embodiments, steps 410 to 420, described hereafter, may occur prior to step 405.

At step 415, the mobile communication device 110 determines the signal strength of the signals 115 from the WAPs 115. In general, it is understood that the antenna 315, however, will detect any signals 115 that are present at the location of the mobile communication device 110. However, in some embodiments, the mobile communication device 110 ignores the signals 115 until triggered to do otherwise. However, in some embodiments, the mobile communication device 110 may be constantly and/or periodically determining the strength of the signals 115 (e.g. in a "monitor" mode), while in other embodiments the mobile communication device 110 may be determining the strength of the signals 115 when triggered.

At step 420, the data set D1, as described above, is compiled by processing the signals 115 to extract the identifier of the WAP 116 which originate each signal, associating the identifier with the signal strength, and saving the associated pair in the data set D1 in any desired format. At step 425 the data set D1 is transmitted to the computing device 130. In some embodiments, the mobile communications device 110 is pre-provisioned with the address of the computing device 130, however in other embodiments, the address of the computing device 130 may be transmitted to the mobile communications device 130 via the request transmitted at step 405 (in some embodiments).

At step 430, the data set D1 is received at the computing device 130, and at step 435, the scaled signal strengths are determined as described above. At step 440, the scaled signal strengths are compared with the record R1 of signal strengths, as described above, and at step 445 the location L1 of the mobile communication device is determined, based on the comparison of step 440, for example via a database look-up. In some embodiments, more than one match may occur during the comparison. In these embodiments, further information may be used to choose between them. In some embodiments, the match having the most current trained/calibrated timestamp may be chosen. In other embodiments, the match closest to a last known location of the user 112 may be chosen and further based on the direction the user 112 was travelling (e.g. based on at least two previous location determinations).

Some of these embodiments may also take into consideration how much time has elapsed between location determinations, such that a distance delta is estimated. For example, if the user 112 was recently at one end of the floor 123 and one of the matches is at the opposite end, that match could be dropped and/or, matches may be weighted according to distance/time elapsed since the last location determination.

At step 450, the location L1 may be provided to the presence server 160 and/or the PBX 170, and at step 460 the presence server 160 and/or the PBX 170 may provide a presence based service or application based on the location L1.

Figure 5:
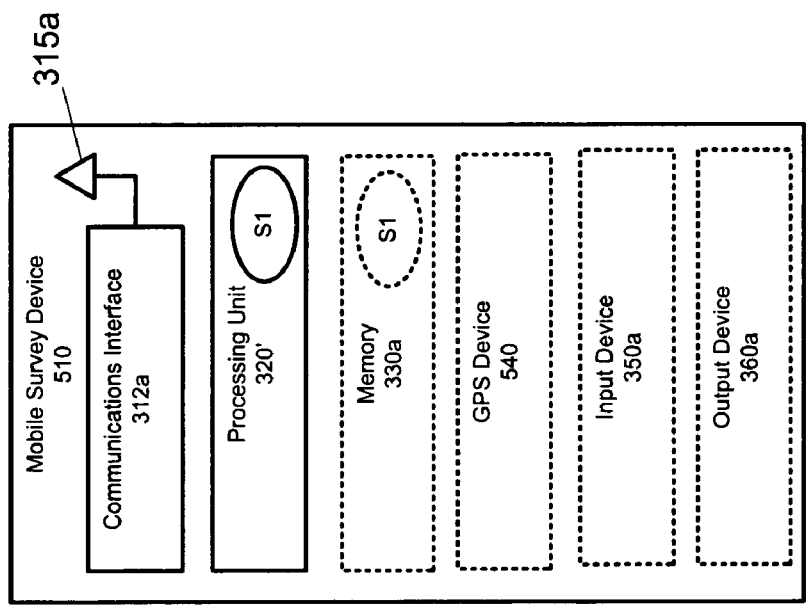
FIG. 5 depicts a mobile survey device, according to a non-limiting embodiment.

The provisioning of the record R1 of the signal strengths, via the survey process, is now described. A user (e.g. the user 112) is provided with the mobile survey device 510, as depicted in FIG. 5, according to a non-limiting embodiment. The mobile survey device 510 depicted in FIG. 5 is similar to the mobile communications device 110 depicted in FIG. 3, with like elements having like number, however having a letter "a" appended thereto. However, the mobile survey device 510 is enabled to determine the strength of received signals 115 received during the survey process ("survey signals"), as well the identifier of the WAP 116 which originated a signal 115, as described above, for example by processing a site survey client (i.e. application). However, the mobile survey device 510 is further enabled to determine a given location at which the survey signals are received and to further generate survey data set S1 comprising the strength of the survey signals, identifiers of WAPs 116 which originated each survey signal; and at least one location of the mobile survey device 510 when the survey signals were received. It is understood that the term "survey signals" does not imply that a special signal is generated and transmitted by the WAPs 116, but rather that a survey a signal is a signal 115 received at the mobile survey device 510 during the survey process. Indeed, the survey signals are generally representative of signals 115 received at the mobile communications device 110 during a location determination, as described above.

In some embodiments the mobile survey device 510 comprises a Global Positioning System (GPS) device 540, and the location of the mobile survey device 510 may be determined via the GPS device 540. In other embodiments, the location of the mobile survey device 510 may be entered into the mobile survey device via the input device 350a.

In any event, during the survey process, the user moves around the area in which location is to be later determined (e.g. the building 120), and stops periodically to initiate a determination of the WAP 116 signature of a given location. In generally, the accuracy of the later location determination is dependent on the number and density of given locations where WAP 116 signatures are collected. However, the number of WAP 116 signatures that are collected is not to be considered unduly limiting.

When the user initiates the collection of a WAP 116 signature, for example by interacting with the input device 350a, the mobile survey device 510 then determines the strength of signals 115 at the given location, for each WAP 116, and determines an identifier of the given location, for example by querying the GPS device 540 for GPS coordinates (longitude and latitude and, in some embodiments, height above sea level), or by prompting the user to enter an identifier of the given location via the input device 350a. It is this identifier of the given location which is later provided as the location of the mobile computing device 110.

In some non-limiting embodiments, a total of X samples of signal strength are measured per second, and the average signal strength is calculated. This may be done for a period of Y seconds, which yields Y entries (i.e. WAP 116 signatures)

each representing an average of X samples of signal strength for each second. In one non-limiting embodiment a total of 10 samples of signal strength are measured per second (i.e. X=10), for a period of 5 seconds (i.e. Y=5), such that five entries are created for the given location (one for each second, ten samples per second averaged into one result). Table III is a non-limiting example of survey data for "Living Room" area, collected via a successful prototype:

TABLE III

| MAC Address | Signal strength | | | | |
|---|---|---|---|---|---|
| 00:00:00:00:00:01 | −33 | −37 | −31 | −36 | −30 |
| 00:00:00:00:00:02 | −45 | −39 | −42 | −42 | −43 |
| 00:00:00:00:00:03 | −27 | −27 | −24 | −24 | −26 |
| 00:00:00:00:00:04 | −67 | −70 | −71 | −68 | −66 |

Table III comprises six columns of five rows, the first column, labelled "MAC Address" comprising the MAC address of the WAP 116 for which the signal strength was determined while surveying the "Living Room" location. The remaining columns represent the signal strength for each WAP 116, having the MAC address identified in the first column, and further represent the average of 10 determinations of signal strength. The data in Table III is then used to generate the survey data set S1, the data in Table III being associated with the location "Living Room".

It is also noted that, in this embodiment, five separate WAP 116 signatures are collected for the location "Living Room".

While performing the site survey, the user performing the site survey can turn in a circle to obtain a broader result set. In one non-limiting embodiment, the user may perform a standardized survey at each site, for example, turning in a circle at a given rate and/or determining signal strength while facing north, south, east and west, or any other set of desired directions. This may be done as the user's body may attenuate the survey signals during the survey; as the body of the user 112 may also attenuate the signals 115 during the later location determination, turning in a circle during the site survey may assist in the later location determination as it provides a correction for attenuation by the body of the user 112.

Once finished generating survey data set S1 the mobile survey device 510 transmits the data it to the computing device 130. The data set S1 may be transmitted once the entire survey data set S1 is collected for a building etc. (e.g. via the user performing the survey pressing a survey completed button within the survey client), or after the data for each location is collected (i.e. the survey data set S1 is transmitted piecewise). The computing device 130 receives the survey data S1, and causes the record R1 to be created in which the signal strengths for given locations are recorded.

In some embodiments, the record R1 is used to train a three layer neural network. The inputs to the neural network are the scaled signal strengths and the output is the location. However, in some embodiments, the inputs to neural network may be the survey data set S1, the neural network enabled to perform the scaled signal strength calculation.

In some embodiments, the implementation is limited to a maximum number of inputs, but the number of inputs is not to be considered unduly. In some of these embodiments, the inputs are also ordered by MAC address (or another type identifier arranged in a given order): for example, WAP 116-1 will occupy input one, WAP 116-2 will occupy input 2, etc. This order remains static to maintain data uniqueness. In these embodiments, the data set D1 obtained during the later location determination may also be provided in the same order. For example, if a user (either the user performing a site survey or the user 112 during the location determination) moves to another location where the mobile survey device 510 (and/or the mobile communications device 110) could no longer "see" the WAP 116 having the MAC 00:00:00:00:00:01 but could see MAC 00:00:00:00:00:05, the latter would occupy input five and input one would be set to zero. In some embodiments, the training of the neural network involves one more step: since there are five entries for a specific location, the neural network appends a marker (_1, _2, _3, _4, _5) to the end of each location identifier. Hence, for each location, the neural network is effectively aware of five different readings.

With the neural network trained, the computing device 130 can accept queries, for example from the presence engine 160 and/or the PBX 170. The location determination process is triggered and the mobile communication device 110 scans for available WAP 116 signals 115, as in the training process. The data set D1 is then pushed to the computing device 130 (e.g. via a query interface), which runs the data set D1 through the neural network. The result is the top two matches for the given input/location. Since five trained locations are stored per actual location, the marker is stripped from the end of location leaving just the names to be displayed to the user.

Those skilled in the art will appreciate that in some embodiments, the functionality of the mobile communication device 110, the computing device 130 and the mobile survey device 510 may be implemented using pre-programmed hardware or firmware elements (e.g., application specific integrated circuits (ASICs), electrically erasable programmable read-only memories (EEPROMs), etc.), or other related components. In other embodiments, the functionality of the mobile communication device 110, the computing device 130 and the mobile survey device 510 may be achieved using a computing apparatus that has access to a code memory (not shown) which stores computer-readable program code for operation of the computing apparatus. The computer-readable program code could be stored on a medium which is fixed, tangible and readable directly by these components, (e.g., removable diskette, CD-ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments.

What is claimed is:

1. A method of locating a mobile communication device, comprising,
   receiving a data set comprising strengths of signals received at the mobile communication device from a plurality of wireless access points, said data set further comprising identifiers of wireless access points from which each said signal was received;
   determining a scaling factor, wherein said determining said scaling factor is based on an antenna strength of a survey device used to collect said record of signal strengths compared to an antenna strength of the mobile communications device;

receiving said scaling factor in conjunction with said data set;

determining scaled signal strengths from said strengths of signals by scaling said signal strengths by said scaling factor;

comparing said scaled signal strengths with a record of signal strengths of wireless access points at given locations; and determining a location of the mobile communication device based on said comparing.

2. The method of claim 1, wherein said determining said scaling factor comprises designating a reference signal in said data set, determining a signal strength of said reference signal, and calculating said scaling factor based on said signal strength of said reference signal, such that said reference signal is normalized upon said scaling.

3. The method of claim 1, further comprising receiving said antenna strength of the mobile communications device in conjunction with said data set.

4. The method of claim 1, further comprising receiving an identifier of the mobile communications device, and determining said antenna strength of the mobile communications devices based on said identifier.

5. The method of claim 4, wherein said determining said antenna strength of the mobile communications device based on said identifier comprises retrieving said antenna strength from a database, said antenna strength of the mobile communications device stored in association with said identifier in said database.

6. The method of claim 1, further comprising receiving an identifier of the mobile communications device, and determining said scaling factor based on said identifier.

7. The method of claim 1, Wherein said scaled signal strengths matches said record of signal strengths of wireless access points if a pattern of the scaled signal strengths matches a pattern in said record of signal strengths.

8. The method of claim 1, further comprising:

receiving at least one survey data set comprising:

strengths of survey signals, said survey signals comprising signals received at a mobile survey device from said plurality of wireless access points during a signal survey;

identifiers of wireless access points which originated each said survey signal; and at least one location of said mobile survey device when said survey signals were received; and processing said at least one survey data set to produce said record of signal strengths of wireless access points at given locations.

9. The method of claim 8, wherein said strength of each said signal comprises an average of strengths of each signal.

10. The method of claim 8, further comprising storing said record of signal strengths.

11. The method of claim 1, wherein each said access point comprises an 802.11 access point and each said signal comprises and 802.11 signal.

12. The method of claim 1, wherein further comprising providing said location to at least one of a presence engine and a PBX for providing at least one of a location based service and a location based feature.

13. A computing device for locating a mobile communication device, comprising, a communications interface enabled for receiving (i) a data set comprising strengths of signals received at the mobile communication device from a plurality of wireless access points, said data set further comprising identifiers of wireless access points from which each said signal was received, and (ii) a scaling factor in conjunction with said data set, wherein said scaling factor is based on an antenna strength of a survey device used to collect said record of signal strengths compared to an antenna strength of the mobile communications device;

a processing unit in communication with said communications interface, said processing unit enabled for:

determining scaled signal strengths from said strengths of signals by scaling said signal strengths by said scaling factor;

comparing said scaled signal strengths with a record of signal strengths of wireless access points at given locations; and determining a location of the mobile communication device based on said comparing.

14. The computing device of said claim 13, further comprising a memory for storing said record of signal strengths.

15. The computing device of claim 13, wherein said processing unit is further enabled to operate a neural network for said comparing said scaled signal strengths with said record of signal strengths and for said determining said location of the mobile communication device based on said comparing.

16. The computing device of claim 13, wherein said processing unit is further enabled for processing at least one survey data set received from a mobile survey device, the at least one survey data set comprising:

strengths of survey signals, said survey signals comprising signals received at said mobile survey device from said plurality of wireless access points during a signal survey;

identifiers of wireless access points which originated each said survey signal; and at least one location of said mobile survey device when said survey signals were received; and wherein said processing unit is further enabled for processing said at least one survey data set to produce said record of signal strengths of wireless access points at given locations.

17. The computing device of claim 13, wherein said communications interface is further enabled for providing said location to at least one of a presence engine and a PBX for providing at least one of a location based service and a location based feature.

* * * * *